United States Patent
Kuiseko

(10) Patent No.: US 6,631,001 B2
(45) Date of Patent: *Oct. 7, 2003

(54) SPECTRAL IMAGE INPUT DEVICE

(75) Inventor: Manami Kuiseko, Kyoto (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,536

(22) Filed: Aug. 11, 1999

(65) Prior Publication Data

US 2003/0142318 A1 Jul. 31, 2003

(30) Foreign Application Priority Data

Aug. 26, 1998 (JP) .......... 10-239804

(51) Int. Cl.$^7$ .................. G01B 9/02
(52) U.S. Cl. .............. 356/456; 356/453
(58) Field of Search .............. 356/456, 453, 356/451, 491

(56) References Cited

U.S. PATENT DOCUMENTS 4,732,480 A * 3/1988 Fortunato et al. .......... 356/346
4,732,481 A * 3/1988 Matsui et al. .......... 356/453
4,814,604 A * 3/1989 Lequime .......... 250/227.21
4,983,041 A * 1/1991 Inaba .......... 356/453
5,420,686 A 5/1995 Takahashi et al. .......... 356/351

* cited by examiner

Primary Examiner—Frank G. Font
Assistant Examiner—Phil Natividad
(74) Attorney, Agent, or Firm—Sidley Austin Brown & Wood LLP

(57) ABSTRACT

A spectral image input device has an image forming optical system for forming an image of image light on an image forming surface and a phase difference generating unit disposed anterior to the image forming surface in the direction of image light travel. The phase difference generating unit constitutes, sequentially in the direction of image light travel, a polarizer for transmitting only polarized light in a specific direction, an optical element formed of a solid material having a birefringence, and arranged such that the principal refraction index axis is inclined 45° relative to the polarization angle of the analyzer, the optical element generating a phase difference in accordance with the wavelength of the image light based on the difference in the physical thickness of the optical element in the direction of image light travel and an analyzer for transmitting only the image light of a polarization angle of 90° relative to the direction of the polarized light of the polarizer.

9 Claims, 4 Drawing Sheets

SPECTRAL IMAGE INPUT DEVICE

CROSS-REFERENCE TO RELATED APPLICATIONS

This application is based on Application No. 10-239804 filed in Japan, the content of which is hereby incorporated by reference.

BACKGROUND OF THE INVENTION

1. Field of the Invention

The present invention relates to a spectral image input device, and specifically relates to a spectral image input device which inputs an interference image of an object to a optical element using a optical element having birefringence characteristics.

2. Description of the Related Art

Conventionally, to obtain a spectral interference image of an object, the interferometer principle is generally used. An interferometer typically divides a light ray into two optical paths using a beam splitter or the like, and after inducing a slight optical path difference (phase difference) and unifying the rays, utilizes the generated interference. FIGS. 8 and 9 show an image input device which uses the interferometer principle. In FIGS. 8 and 9, reference number 1 refers to an image forming lens, reference number 2 refers to a beam splitter, reference numbers 3 through 6 refer to total reflective mirrors, and reference number 7 refers to an area optical element element. In this type of device, the mirrors are moved along the optical axis and rotated to produce an interference image of the light at different wavelengths, thereby functioning as a spectral image input device.

On the other hand, interference devices are known which do not divide the light rays into two optical paths. This method uses materials having a birefringence. In this interference device, a birefringence material having a principal refractive index axis (crystal axis) of 45° relative to a polarizer is disposed between an analyzer and a deflector arranged at a mutual polarization angle of 90°. The birefringence material has different refractive indices for ordinary rays and extraordinary rays, and the speeds at which the ordinary rays and the extraordinary rays pass through the material also differ. For these reasons a phase difference is generated by the ordinary rays and the extraordinary rays transmitted material of identical thickness. When the phase difference is an integer multiple of a single phase period of light of a certain wavelength, the light of this wavelength generates interference. FIG. 10 illustrates the generation of a phase difference by a material having birefringence; Reference symbol A represents the principal refractive index axis direction, reference symbol B represents oscillation direction and speed of the incidence rays, reference symbol Bo represents the oscillation direction and speed of ordinary rays passing through the material, and reference symbol Be represents the oscillation direction and speed of extraordinary rays passing through the material.

Conventional interference devices are known to use liquid crystals as materials having birefringence. FIG. 11 shows an example of such an interference device; reference number 11 refers to a polarizer, reference number 12 refers to an analyzer, and reference number 13 refers to a liquid crystal, which is interposed between glass plates 14. The arrow A indicates the principal refractive index direction of the liquid crystal. FIG. 12 shows an example wherein a plurality of liquid crystals 13 are arranged so as to change the wavelength of the light generating interference when a voltage is applied between the glass plates 14. FIG. 13 shows an example wherein two wedge shaped liquid crystals 13 are overlaid such that the principal refractive index axis directions A are perpendicular, and interference of light of different wavelengths is generated by the position at which the rays pass through the liquid crystals.

The interference device using a beam splitter shown in FIGS. 8 and 9 are disadvantageous, however, inasmuch as a long optical path is required to generate interference, and a specialized optical system is necessary. Furthermore, the device itself is enlarged as the optical path is lengthened.

On the other hand, interference devices which use material having a birefringence are advantageous insofar as the optical path can be shortened. However, material having a birefringence has a difference in the refractive indices of the ordinary rays and the extraordinary rays on the order of 1/1000, e.g., a thickness of approximately 60 μm is necessary to accurately realize interference of light at a wavelength of 590 nm. High precision can be realized providing glass plates on bilateral sides of a liquid crystal. It is difficult to arrange the principal refractive index axis when the liquid crystal is a relatively thick 60 μm. When considering that the thickness of the liquid crystals typically used in display devices is at most several micrometers, it becomes extremely difficult to make a practical interference device using liquid crystals. Liquid crystals also require fluid leakage countermeasures.

SUMMARY OF THE INVENTION

An object of the present invention is to provide an improved spectral image input device.

Another object of the present invention is to provide a spectral image input device having a short optical path and compact construction, and is capable of producing an interference image at a predetermined wavelength.

Still another object of the present invention is to provide a spectral image input device which can be manufactured and assembled with excellent precision, and is capable of producing an interference image at a predetermined wavelength.

These objects are attained by providing a spectral image input device comprising, an image forming optical system for forming images of image light on an image forming surface; and an optical image element formed of a solid material having a birefringence and disposed anterior to the image forming surface in the direction of travel of the image light. This optical element provides a phase difference in accordance with the wavelength of the image light based on the difference in physical thickness of the optical element in the optical axis direction.

BRIEF DESCRIPTION OF THE DRAWINGS

These and other objects and features of the invention will become clear from the following description taken in conjunction with the preferred embodiments with reference to the accompanying drawings, in which.

DESCRIPTION OF THE PREFERRED EMBODIMENTS

The preferred embodiments of the spectral image input device of the present invention are described hereinafter with reference to the accompanying drawings.

Figure 1:
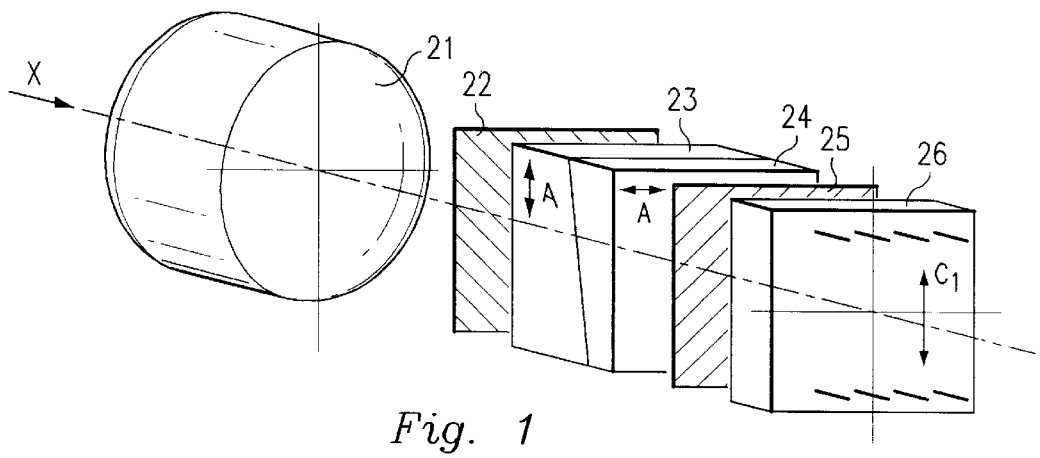
FIG. 1 is a perspective view showing a first embodiment of the spectral image input device of the present invention.
Figure 2:
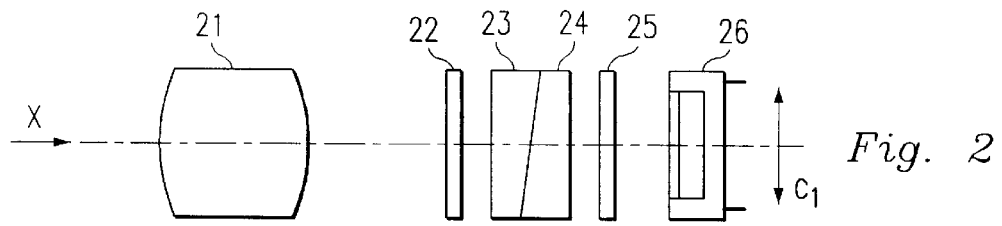
FIG. 2 is a side view of the first embodiment.

First Embodiment (Refer to FIGS. 1 and 2)

The first embodiment is a spectral image input device providing an image forming lens 21, a polarizer 22, a first and second optical elements 23 and 24 having birefringence characteristics, an analyzer 25, and an area optical element 26 arranged relative to the direction X of light travel. The polarizer 22 and the analyzer 25 indicate the oscillation direction of light transmittance as the direction indicated by the diagonal lines, and the oscillation directions intersect in a perpendicular direction within a plane perpendicular to the optical axis. The optical elements 23 and 24 having birefringence characteristics comprise material having a birefringence with different refractive indices for ordinary rays and extraordinary rays such as solid crystals, calcite, dolomite and the like; the direction of the principal refractive index axis is indicated by the arrow A. The principal refractive index axes of the optical elements 23 and 24 having birefringence characteristics intersect in a perpendicular direction within a plane perpendicular to the optical axis, and the principal refractive index axis of the first optical element 23 having birefringence characteristics is arranged at a 45° angle relative to the polarization angle of the polarizer 22. The optical elements 23 and 24 having birefringence characteristics are wedge-shaped and cemented on their mutually inclined surfaces. That is, although the transmission length of the two parts are identical at any transmission position of the two cemented optical elements 23 and 24 having birefringence characteristics, the thickness difference Δd changes continuously from the bottom edge to the top edge.

In this type of spectral image input device, an optical path difference (phase difference) is generated between the ordinary rays and the extraordinary rays by the 90° shift in the oscillation directions of the transmission light based on the thickness difference Δd of the optical elements 23 and 24 having birefringence characteristics. That is, when a phase difference of an integer multiple of a single period of the light of a certain wavelength is caused by the thickness difference Δd, an interference image of the light of that wavelength is input to the area optical element 26. When the wavelength of the transmission light is designated λ, the refractive index of ordinary light is designated no, and the refractive index of extraordinary light is designated ne, the thickness difference Δd can be determined by the following equation.

$$\Delta d = \lambda/(no-ne)$$

For example, when no=1.5534, and no=1.5443, a transmission light of wavelength λ=590 nm generates interference at Δd=0.59/0.0091=64.8 μm. In the present embodiment, the thickness difference Δd matches the rectangular direction C1 of the photoreception area of the optical element element 26. In the direction of change of the difference Δd, the wavelength of the interference differs, such that an identical interference image can be obtained at a different wavelength. When the amount of change in the difference Δd is set smaller than the degree at which change in the interference wavelength can be ignored, a single wavelength interference image is obtained on the screen of the optical element area.

Figure 3:
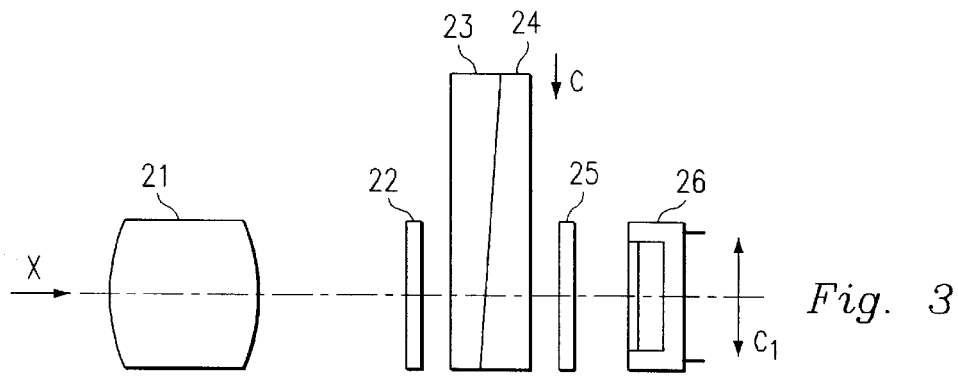
FIG. 3 is a side view showing a second embodiment of the spectral image input device of the present invention.

Second Embodiment (Refer to FIG. 3)

The second embodiment is a spectral image input device wherein the optical elements 23 and 24 having birefringence characteristics have a size more than double the lengthwise dimension and short edge dimension of the optical element area of the optical element element 26 such that the direction of change in the thickness difference Δd matches the short edge direction C1, and the optical elements 23 and 24 having birefringence characteristics are slidable in the arrow C direction, i.e., the direction of change in the difference Δd. In other respects the construction is identical to that of the first embodiment.

In the second embodiment, an image is input as the optical elements 23 and 24 having birefringence characteristics slide in the arrow C direction. One line of the image is read in one line in the horizontal direction of equal phase difference of the transmission light (one line parallel to the lengthwise edge direction of the optical element area), then one line of the image is read in the next adjacent line (the phase difference is different than the preceding transmission light). The lines change sequentially, and the read image lines are combined to generate a single image. If the optical elements 23 and 24 having birefringence characteristics slide to position a predetermined line on the optical axis when reading one line of the image, an interference image of the same wavelength can be generated as a single image.

Figure 4:
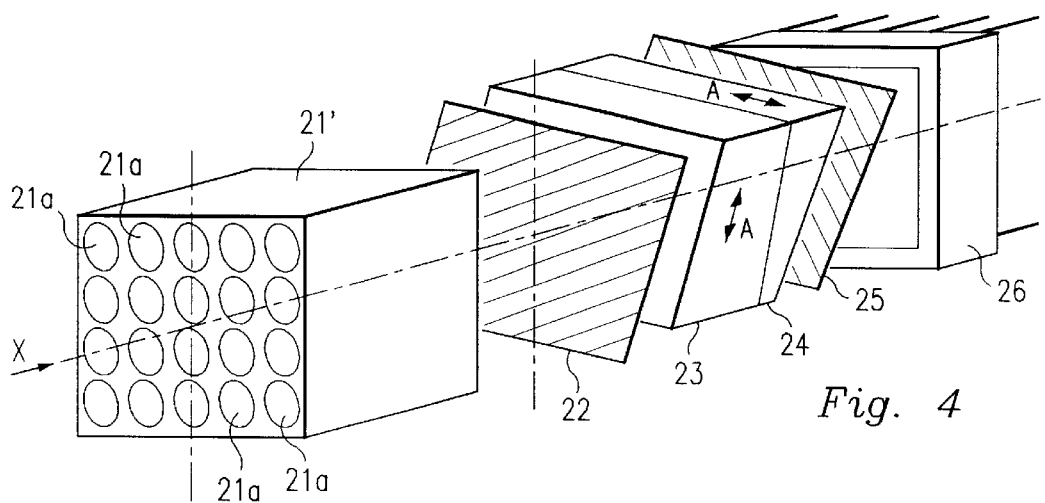
FIG. 4 is a perspective view showing a third embodiment of the spectral image input device of the present invention.
Figure 5:
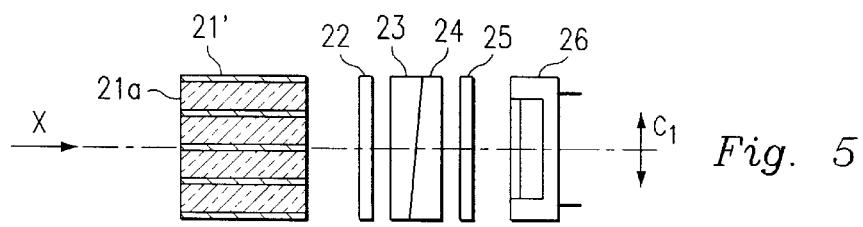
FIG. 5 is a side view of the third embodiment.

Third Embodiment (Refer to FIGS. 4 and 5)

The third embodiment is a spectral image input device using a lens array 21' comprising a collection of lens elements 21a as an image forming lens. In other respects the construction is identical to that of the first embodiment.

The third embodiment is capable of producing a single interference image in each lens element 21a in a range of sufficiently small change in the thickness difference Δd of the optical elements 23 and 24 having birefringence characteristics.

Figure 6:
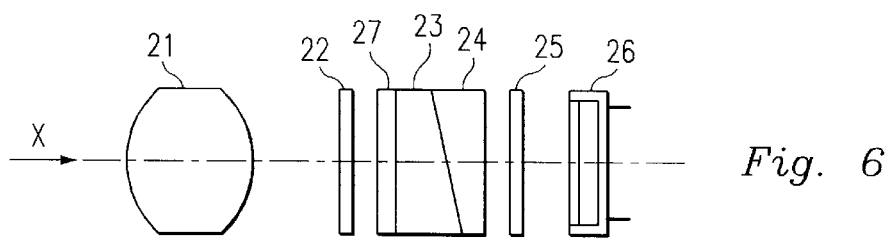
FIG. 6 is a side view showing a fourth embodiment of the spectral image input device of the present invention.

Fourth Embodiment (Refer to FIG. 6)

The fourth embodiment is a spectral image input device in which a single flat plate type optical element 27 having birefringence characteristics supplements the two wedge-shaped optical elements 23 and 24 having birefringence characteristics. Although the total thickness of the optical elements 23, 24, 27 having birefringence characteristics changes, the added optical element 27 having birefringence characteristics does not affect the thickness change Δd of the optical elements 23 and 24 having birefringence characteristics.

When using overlaid optical elements 23 and 24 having birefringence characteristics which are completely identical in shape and dimensions, white light interference occurs in the center area, such that a darkening occurs until the thickness change Δd attains the approximate wavelength of 400 nm (shortest wavelength of visible light), and interference wavelengths appear symmetrically on bilateral sides thereof. The optical element 27 having parallel birefringence characteristics at a thickness corresponding to an optical path length difference of 0~400 nm or a desired wavelength may be added to read only visible light or light of a desired wavelength. That is, light of a desired wavelength can be selectively obtained by adding the optical element 27 having parallel birefringence characteristics even when the thickness difference Δd of the optical elements 23 and 24 having birefringence characteristics is zero. The principal refractive index axis of the optical element 27 having parallel birefringence characteristics may match the principal refractive index axis of either optical element 23 and 24 having birefringence characteristics.

Figure 7:
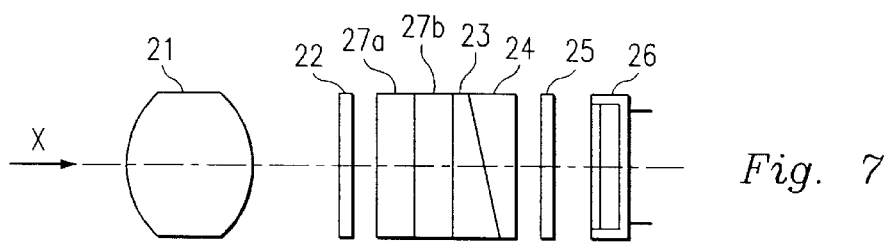
FIG. 7 is a side view showing a fifth embodiment of the spectral image input device of the present invention.
Figure 8:
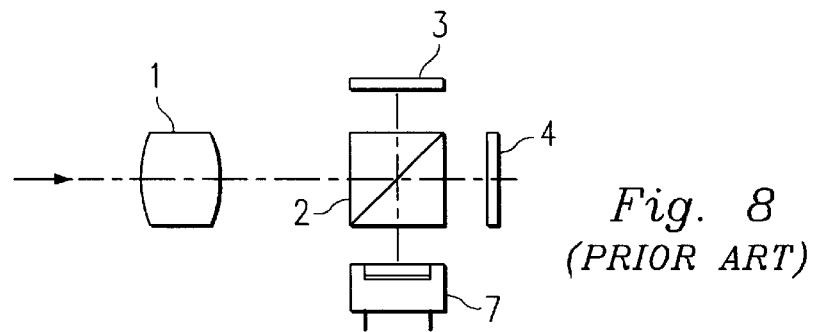
FIG. 8 is a side view showing a first example of a conventional spectral image input device using a beam splitter.
Figure 9:
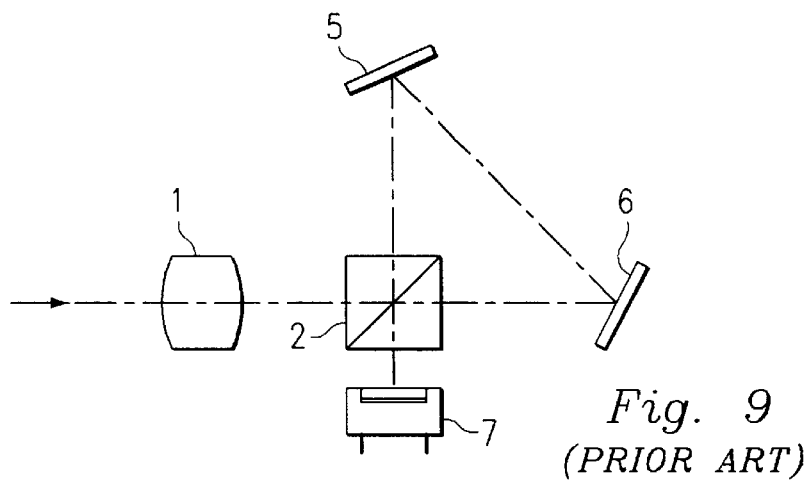
FIG. 9 is a side view showing a second example of a conventional spectral image input device using a beam splitter.
Figure 10:
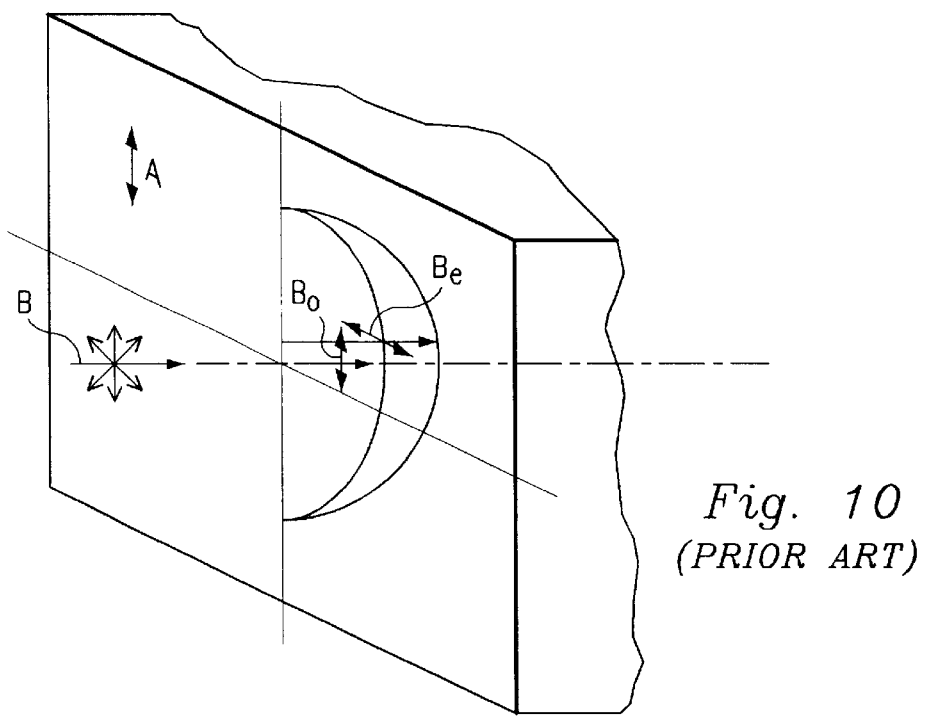
FIG. 10 illustrates the generation of a phase difference by the material having a birefringence.
Figure 11:
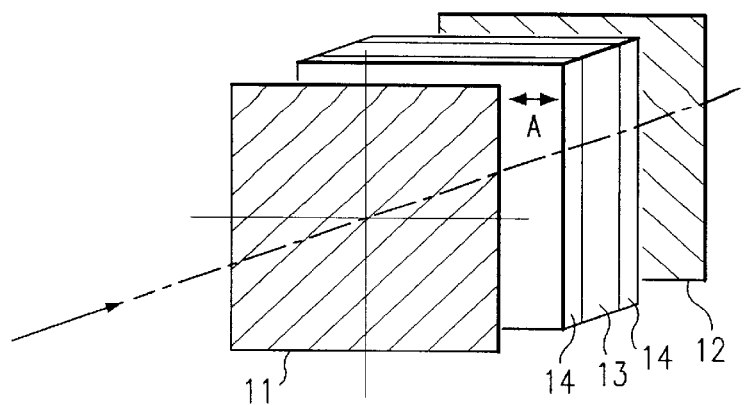
FIG. 11 is a perspective view showing a first example of a conventional spectral image input device using a liquid crystal.
Figure 12:
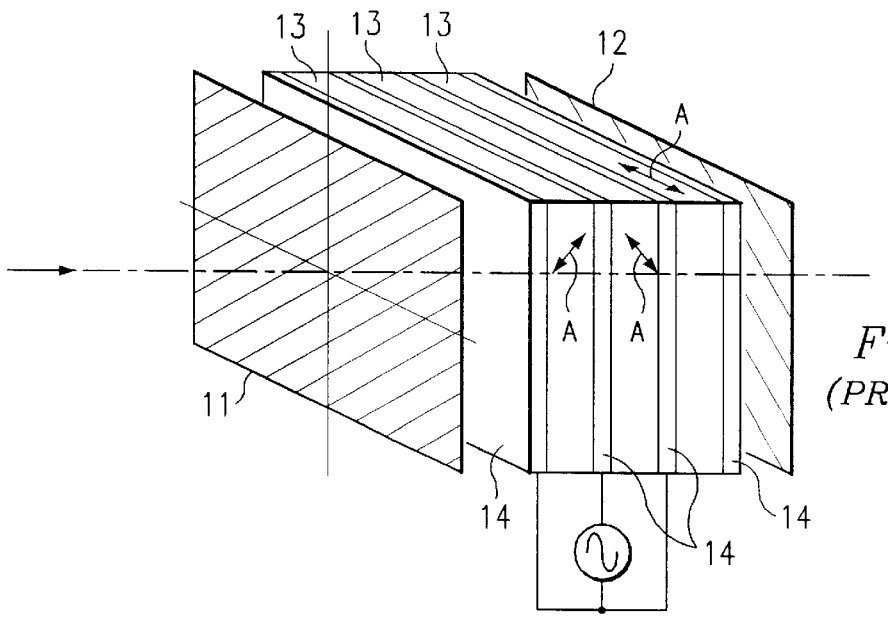
FIG. 12 is a perspective view showing a second example of a conventional spectral image input device using a liquid crystal.
Figure 13:
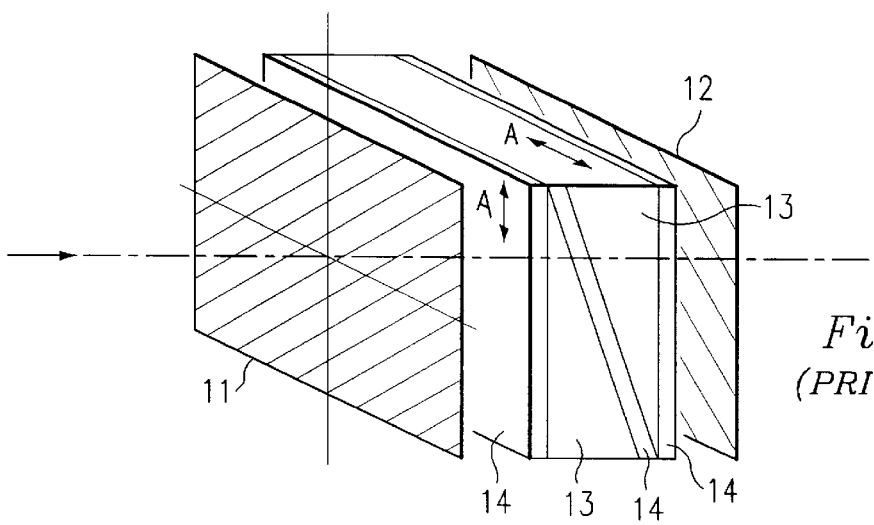
FIG. 13 is a perspective view showing a third example of a conventional spectral image input device using a liquid crystal.

Fifth Embodiment (Refer to FIG. 7)

The fifth embodiment is a spectral image input device in which two flat plate type optical elements 27a and 27b having birefringence characteristics supplement the two wedge shaped optical elements 23 and 24 having birefringence characteristics. In other respects the construction is identical to that of the fourth embodiment, and the operation of the added optical elements 27a and 27b having birefringence characteristics is identical to the operation of the optical element 27 having birefringence characteristics described in the fourth embodiment. Since it is difficult to manufacture a liquid crystal panel having a thickness of about 50 μm, the two liquid crystal panels 27a and 27b having a thickness which is easy to manufacture may be overlaid. The optical elements 27a and 27b having parallel birefringence characteristics are overlaid such that the principal refractive index axes intersect in a perpendicular direction, and also align with the principal refractive index axes of the wedge shaped optical elements 23 and 24 having birefringence characteristics.

Other Embodiments

The spectral image input device of the present invention is not limited to the previously described embodiments, and may be variously modified insofar as such modifications are within the scope of the present invention.

The thickness difference d is particularly important relative to the optical elements 23 and 24 having birefringence characteristics, and their arrangement may be inverted relative to the optical axis. If the optical elements 23 and 24 having birefringence characteristics are rotated a set angle within a plane perpendicular to the optical axis, the wavelength of the interference can be slightly changed in a direction perpendicular to the direction of change of the thickness difference Δd. Needless to say, the desired effectiveness can be achieved without mutual rotation of the polarizer, the analyzer, and the optical elements having birefringence characteristics to severe angles of 90° or 45°.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A spectral image input device comprising:
   an image forming optical system for forming an image of image light on an image forming surface;
   a phase difference generating unit disposed anterior to the image forming surface in a direction of image light travel; and
   an area optical element disposed at an optically equivalent position with the image forming surface of the image forming optical system,
   wherein the phase difference generating unit comprises sequentially in the direction of image light travel:
   a polarizer, a first optical element, an analyzer, and a second optical element,
   the polarizer for transmitting only polarized light in a specific direction;
   the first optical element formed of a solid material having a birefringence, the first optical element arranged such that a principal refraction index axis is inclined 45° relative to a polarization angle of the analyzer, the first optical element generating a phase difference in accordance with a wavelength of the image light based on a difference in a thickness of the first optical element in the direction of image light travel, the first optical element having an optical function surface inclined at a predetermined angle relative to the direction of image light travel;
   the analyzer for transmitting only the image light of a polarization angle of 90° relative to the direction of the polarized light of the polarizer; and
   the second optical element formed of solid material having birefringence on a principal refraction index axis inclined 90° relative to the principal refraction index axis of the first optical element through the optical function surface.

2. A spectral image input device claimed in claim 1, wherein the image forming optical system is a lens array comprising a collection of lens elements.

3. A spectral image input device comprising:
   an image forming optical system for forming an image of image light on an image forming surface;
   a phase difference generating unit disposed anterior to the image forming surface in a direction of image light travel; and
   a first optical element disposed at an optically equivalent position with the image forming surface of the image forming optical system,
   the phase difference generating unit comprising sequentially in the direction of image light travel:
   a polarizer, a second optical element, and an analyzer,
   the polarizer for transmitting only polarized light in a specific direction;
   the second optical element formed of a solid material having a birefringence, and arranged such that a principal refraction index axis is inclined 45° relative to a polarization angle of the analyzer, the second optical element generating a phase difference in accordance with a wavelength of the image light based on a difference in a thickness of the second optical element in the direction of image light travel; and the analyzer for transmitting only the image light of a polarization angle of 90° relative to the direction of the polarized light of the polarizer; and wherein the difference in thickness at an optional transmission position of the second optical element satisfies the following equation:

$$\Delta d = \lambda/(no-ne)$$

where $\Delta d$ represents the difference in thickness, $\lambda$ represents the wavelength of the image light, no represents a refractive index of ordinary light transmitted through the second optical element, and ne represents a refractive index of extraordinary light transmitted through the second optical element.

4. A spectral image input device according to claim 3, further comprising:

disposed between the second optical element and the analyzer, a third optical element formed of solid material having birefringence on the principal refraction index axis inclined 90° relative to the principal refraction index axis of the second optical element through an optical function surface.

5. A spectral image input device claimed in claim 3, wherein the image forming optical system is a lens array comprising a collection of lens elements.

6. A spectral image input device comprising:

an image forming optical system for forming an image of image light on an image forming surface;

a phase difference generating unit disposed anterior to the image forming surface in a direction of image light travel; and an area optical element disposed at an optically equivalent position with the image forming surface of the image forming optical system, the phase difference generating unit comprising sequentially in the direction of image light travel:

a polarizer, a first optical element, and an analyzer, the polarizer for transmitting only polarized light in a specific direction;

the first optical element formed of a solid material having a birefringence, and arranged such that a principal refraction index axis is inclined 45° relative to a polarization angle of the analyzer, the first optical element generating a phase difference in accordance with a wavelength of the image light based on a difference in a thickness of the first optical element in the direction of image light travel;

the analyzer for transmitting only the image light of a polarization angle of 90° relative to the direction of the polarized light of the polarizer; and wherein the difference in thickness of the first optical element induces a phase difference in the image light only for a short wavelength component along a first edge, and induces a phase difference in the image light only for a long wavelength component along a second edge, such that the difference in thickness continuously changes from the first edge to the second edge.

7. A spectral image input device according to claim 6, further comprising:

disposed between the first optical element and the analyzer, a second optical element formed of solid material having birefringence on the principal refraction index axis inclined 90° relative to the principal refraction index axis of the first optical element through the optical function surface.

8. A spectral image input device claimed in claim 6, wherein the first edge is shorter than the second edge, and wherein the first optical element has a size more than double the length of the second edge and the first edge, and is adapted to move in a direction of the second edge.

9. A spectral image input device claimed in claim 6, wherein the image forming optical system is a lens array comprising a collection of lens elements.

* * * * *